United States Patent [19]

Hiraoka et al.

[11] Patent Number: 4,969,262

[45] Date of Patent: Nov. 13, 1990

[54] METHOD OF MAKING CAMSHAFT

[75] Inventors: Takeshi Hiraoka, Shiraora; Shunsuke Takeguchi, Nogi; Satoshi Kawai, Kuki, all of Japan

[73] Assignee: Nippon Piston Ring Co., Ltd., Tokyo, Japan

[21] Appl. No.: 496,173

[22] Filed: Mar. 20, 1990

Related U.S. Application Data

[63] Continuation of Ser. No. 324,088, Mar. 16, 1989, abandoned.

[30] Foreign Application Priority Data

Mar. 17, 1988 [JP] Japan .................. 63-61911

[51] Int. Cl.$^5$ .................. B23P 19/04; B21K 1/08; B22F 7/04
[52] U.S. Cl. .................. 29/888.1; 29/6.01; 29/38 E; 29/447; 29/888.08; 74/567; 419/8
[58] Field of Search .................. 29/6.01, 38 E, 445, 29/447, 888.08, 888.1; 74/567; 419/8, 15

[56] References Cited

U.S. PATENT DOCUMENTS

| 3,962,772 | 6/1976 | Haller | 419/8 |
| 4,137,106 | 1/1979 | Doi et al. | 419/8 |
| 4,236,923 | 12/1980 | Takahashi et al. | 419/8 X |
| 4,524,046 | 6/1985 | Suganuma et al. | 419/8 |
| 4,578,317 | 3/1986 | Nakamura | 419/8 X |
| 4,595,556 | 6/1986 | Umeha et al. | 419/8 |
| 4,743,425 | 5/1988 | Ohsaki et al. | 419/15 |

FOREIGN PATENT DOCUMENTS

| 31002 | 2/1983 | Japan | 419/8 |
| 58-41211 | 3/1983 | Japan . | |
| 58-191458 | 12/1983 | Japan . | |
| 58-192942 | 12/1983 | Japan . | |
| 59-155660 | 9/1984 | Japan . | |
| 59-219402 | 12/1984 | Japan . | |
| 60-39105 | 2/1985 | Japan . | |
| 60-43405 | 3/1985 | Japan . | |
| 230914 | 11/1985 | Japan | 419/8 |

*Primary Examiner*—Joseph M. Gorski
*Assistant Examiner*—Peter Dungba Vo

[57] ABSTRACT

A method of making a camshaft of the type having a cam piece composed of outer and inner layers which comprises the steps of molding a green cam piece in a manner that the outer and inner layers are respectively made from powders of outer-layer and inner-layer forming materials, fitting the green cam piece on a steel shaft to produce a green camshaft assembly, and sintering said green camshaft assembly at a temperature in which the materials shrink and yield a liquid phase to produce a camshaft having a cam piece diffusion-bonded to the outer periphery of the shaft.

The outer-layer forming material is prepared to have an axial shrinkage of 4 to 10% and shrink more than said inner-layer forming material prepared to have an axial shrinkage of 2.5 to 6%.

4 Claims, 1 Drawing Sheet

METHOD OF MAKING CAMSHAFT

This application is a continuation, of application Ser. No. 07/324,088 filed on Mar. 16, 1989, now abandoned.

BACKGROUND OF THE INVENTION

1. Field of the Invention

The present invention relates to a method of making a camshaft for use in a valve mechanism of an internal combustion engine, and more particularly to a process for providing a camshaft of the type having a cam piece composed of inner and outer layers.

2. Description of the Prior Art

It is well known how to make a camshaft of the type having a fitting member composed of at least two layers each being made from an individual sintering materials.

In JP A 58-41211, there is disclosed a cam lobe composed of three layers of which the inner layer is formed out of a steel sleeve and welded to the shaft. The intermediate and outer layers are respectively made from sintering materials which shrink and yield a liquid phase when sintered. In JP U 58-191458, there is disclosed a cam piece composed of three layers of which the outer and inner layers are made from different liquid phase sintering materials, the intermediate layer being made from a solid phase sintering material. The cam piece is joined with a steel shaft by sintering in which the inner layer yields a liquid phase. In JP U 58-192942, there is disclosed a journal composed of two layers of which the inner layer is made from a liquid phase sintering material, the outer layer being made from a solid phase sintering material. In JP A 59-219402, there is disclosed a cam piece composed of two layers of which the inner layer is made from a liquid phase sintering material, the outer layer being made from an iron base sintering material. In JP A 60-39105, there is disclosed a cam piece composed of two layers. The inner layer is made from a copper-base sintering material while the outer layer is made from an iron-base sintering material. In JP A 60-43405, there is disclosed a cam lobe composed of two layers. The inner layer has a shrinkage of less than 2% while the outer layer has a shrinkage of more than 2%. In JP A JP A 59-155660, there is disclosed a cam piece which is composed of two layers of which the outer layer is made from an anti-wear alloy sintering material. The inner layer is made from high toughness sintering material or weld alloy and bonded to a shaft by bulging.

There are disadvantages in the prior art: The cam lobe as shown in JP A 58-41211 requires a process for welding the inner layer of steel sleeve to the shaft, thereby increasing the cost of production. The cam piece as shown in JP A 58-41211 or JP U 58-191458 disadvantageously needs complicated and expensive dies because of being composed of three layers made from sinterable materials. The cam piece of JP U 58-191458 is not reliable in bonding between the outer layer and intermediate layer, since the bonding between the solid and liquid phase sintered materials is less reliable at their common boundary surface. This means that the journal as shown in JP U 58-192942 is less reliable in bonding at the common boundary surface between the solid and liquid phase sintered materials. The cam piece as shown in JP A 59-219402 is also less reliable in bonding at the boundary surface between the outer and inner layers, since the bonding between the iron-base and liquid phase sintered materials is less reliable at their common boundary surface. The method as shown in JP A 60-39105 is easy to have a failure rate beyond a tolerance limit. The reason for this is that the outer layer is caused to swell due to an early penetration of copper from the inner layer into the outer layer when sintered. The inner layer of the cam lobe as shown in JP A 60-43405 has a shrinkage of less than 2%, which is too small to make a reliable bonding between the cam lobe and the shaft. The camshaft as shown in JP A 59-155660 is disadvantageously limited in shape, because the cam piece is bonded to the shaft by bulging.

SUMMARY OF THE INVENTION

It is the primary object of the invention to provide an improved method of making a camshaft of the type having a cam piece composed of inner and outer layers, wherein the both layers are reliably bonded to each other at their common boundary.

In accordance with the present invention, a method of making a camshaft comprising the steps of molding a green cam piece composed of inner and outer layers from outer-layer and inner-layer forming materials which shrink and yield a liquid phase when sintered, fitting the green cam piece on a steel shaft to produce a green camshaft assembly, and sintering the green camshaft assembly to produce a camshaft having a cam piece diffusion-bonded to the outer periphery of the shaft, characterized in that the outer-layer forming material is prepared to have an axial shrinkage of 4 to 10% and shrink more than the inner-layer forming material having an axial shrinkage of 2.5 to 6%.

Powders of two different liquid phase sinterable materials are molded into a green cam piece of the type having outer and inner layers. The outer layer is formed out of one of the materials, that is, an outer-layer forming material, while the inner layer is formed out of the other or an inner-layer forming material. The both materials are entangled with each other at their common boundary surface with result that the both layers are reliably bonded to each other when sintered. The outer-layer forming material shrinks more than the other material which forms the inner layer when sintered. This improves in bonding between the both layers and allows the material forming the inner layer to have a relatively small shrinkage. When the inner layer is less shrinkable, an axial dislocation of each cam piece with respect to the reference position on the camshaft is so reduced that it is practicable to narrow the distance between the adjacent cam pieces without trouble or mount a journal adjacent to the cam piece on the camshaft.

If the outer layer were made from a sinterable material having a shrinkage of less than 4%, it could not back up the inner layer made from a low-shrinkage material and, therefore, would decrease the reliability in the bonding of the cam piece to the shaft. If a difference in shrinkage between the outer-layer and inner-layer forming materials were less than a preselected effective value, the reliability in the bonding between the outer and inner layers would be reduced. But, if the outer-layer forming material had a shrinkage of more than 10%, it would yield an excessive amount of liquid and sometimes cause the cam piece to distort out of tolerance when sintered. Thus, the outer-layer forming material is prepared to have a shrinkage of 4 to 10%. If the inner-layer forming material had a shrinkage of less than 2%, the bonding of the inner layer to the shaft would be insufficient and less reliable. However, if the inner-layer forming material had a shrinkage of more than 6%, the outer-layer forming material would be required to have an inappropriate shrinkage of more than 10%, in order to have the effective difference of shrinkage between the inner and outer layers. Therefore, the inner-layer forming material is prepared to have a shrinkage of 2.5% to 6%.

In preference, the outer layer is made from Fe-C-P-Ni-Cr-Mo system liquid phase sinterable material. The inner layer is made from Fe-C-P or, Fe-C-P-Mo system liquid phase material. Powders of the both materials are molded into a green cam piece of which the outer and inner layers are formed out of the respective materials. The outer-layer forming material is always prepared to have a shrinkage 4 to 10% and be more shrinkable than the inner-layer forming material which has a shrinkage of 2.5 to 6% and is directly bonded to the steel shaft due to diffusion.

Advantages offered by the invention are mainly that the reliability in the bonding between the the outer and inner layers of the cam piece is highly improved, as compared with the conventional cam piece of which the outer and inner layers are respectively made from solid and liquid phase sintered materials or two liquid phase sinterable materials differing little in shrinkage from each other. In the case of the cam piece of which the inner layer is axially shorter than the outer layer, the advantages are that the axial dimensional tolerance after sintering is improved and that the cost of material is saved.

BRIEF DESCRIPTION OF DRAWINGS

The invention will become more fully understood from the detailed description given hereinbelow and the accompanying drawings which are given by way of illustration only, and thus are not limitative of the present invention and wherein.

DETAILED DESCRIPTION OF THE INVENTION

Figure 1:
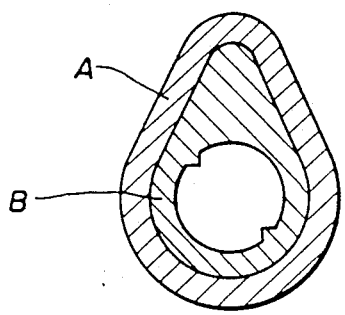
FIGS. 1 and 2 are side elevational and sectional views of the green cam piece according to the present invention.
Figure 2:
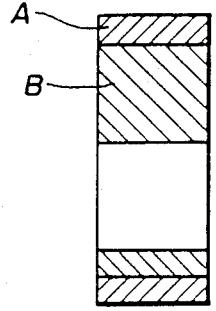

As seen in FIGS. 1 and 2, two different liquid phase sinterable materials A and B are molded into a green cam piece composed of outer and inner layers, which are respectively formed out of the materials A and B. The outer-layer forming material A is of Fe-C-Ni-Cr-Mo system alloy and prepared to have a shrinkage of 8% with respect to the axial direction of a camshaft. The inner-layer forming material B is of Fe-C-P or Fe-C-P-Mo system alloy and prepared to have a shrinkage of 4% with respect to the axial direction.

Figure 3:
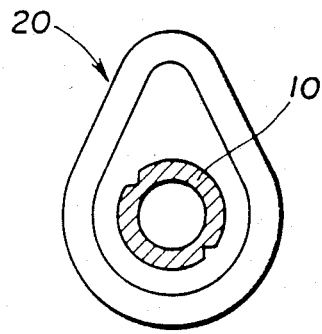
FIG. 3 is a side elevational view of the cam piece assembled to the steel shaft.

As seen in FIG. 3, the green cam piece is assembled to the steel shaft 10. Thereafter, the assembly is sintered at a predetermined temperature in which a liquid phase yields to form a cam piece 20 sintered on the shaft. When sintered, a relatively large quantity of carbide is educed from Fe-C-Ni-Cr-Mo system alloy of the outer-layer forming material A, so that the outer layer is superior in anti-wear and suitable as a superficial member of the cam piece. Bonding between the outer and inner layers is firm and reliable after sintered. The reasons for this are that the outer-layer and inner-layer forming materials A and B are entangled to each other at their common boundary surface when molded into the green compact and that the outer-layer forming material A is more shrinkable by 4% than the inner-layer forming material B. Furthermore, 4% shrinkage of the inner-layer forming material B ensures that the cam piece 20 is firmly diffusion-bonded to the outer periphery of the shaft 10.

Figure 4:
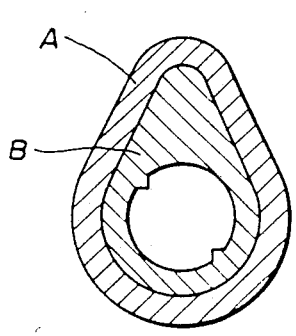
FIGS. 4 and 5 are views of the other embodiment, similar to FIGS. 1 and 2.
Figure 5:
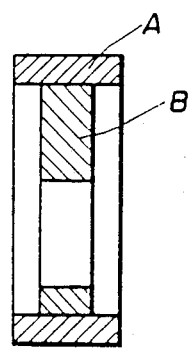

The green cam piece in FIGS. 4 and 5 is also composed of inner and outer layers which are made from the same sinterable materials A and B as in the previous embodiment except their shrinkages. The outer-layer forming material A is prepared to be of 6% shrinkage and the inner-layer forming material B is prepared to be of 3% shrinkage. The axial width of the inner layer is half the axial width of the outer layer, so that the inner-layer forming material B is saved by half as compared with the previous embodiment. The reduction in the axial width of the inner layer advantageously results to the reduction in the axial dimensional tolerance of the camshaft after sintering. In general, the material B is more fluidal and easily compacted to a high density than the material A. When the both materials A and B are filled to the same height in molding, there is a tendency that the material B has a higher density than the material A. Therefore, when the material B is filled to half the axial height of the material A, the material B is much more dense than the material A. The higher the density, the lower the shrinkage. This means that the materials A and B are easily prepared to have the respectively desired shrinkages which differ by a preselected value from each other.

Figure 6:
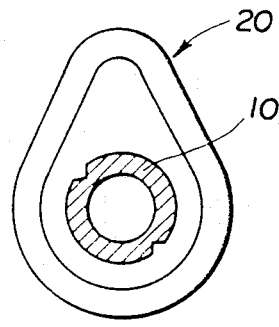
FIG. 6 is a view of the other embodiment, similar to FIG. 3.

As seen in FIG. 6, the green cam piece of FIGS. 4 and 5 is assembled to the steel shaft 10. Thereafter, the assembly is sintered. The cam piece 20 has a small dimensional tolerance with the axial direction of the camshaft. The bonding both between the cam piece 20 and the steel shaft 10 and between the inner and outer layers are firm and highly reliable like the previous embodiment. Due to 3% shrinkage of the inner-layer forming material, the axial dislocation of each cam piece with respect to the reference position on the camshaft is so improved that it is practicable to narrow the distance between the adjacent cam pieces without trouble or mount a journal adjacent to the cam piece on the camshaft.

What is claimed is:

1. A method of making a camshaft comprising the steps of molding a green cam piece composed of outer and inner layers which are respectively formed from outer-layer and inner-layer forming materials, each being adapted to shrink and yield a liquid phase when sintered, fitting said green cam piece onto a steel shaft, thereby producing a green camshaft assembly, and sintering said green camshaft assembly, thereby axially shrinking said outer layer from 4 to 10% and axially shrinking said inner layer from 2.5 to 6%, so that the outer layer shrinks more than the inner layer, whereby the camshaft assembly has a cam piece which is diffusion-bonded to the outer periphery of said shaft.

2. Thee method of claim 1, wherein said inner layer is smaller in axial length than said outer layer.

3. The method of claim 1, wherein said outer, layer-forming material comprises a Fe-C-Ni-Cr-Mo system alloy, and said inner, layer-forming material comprises a Fe-C-P system alloy.

4. The method of claim 1, wherein said outer, layer-forming material comprises a Fe-C-Ni-Cr-Mo system alloy, and said inner, layer-forming material comprises a Fe-C-P-Mo system alloy.

* * * * *